June 19, 1956  B. H. RANKIN  2,751,273
PARTICLE TRAJECTORY PLOTTER
Filed Oct. 7, 1952  2 Sheets-Sheet 1
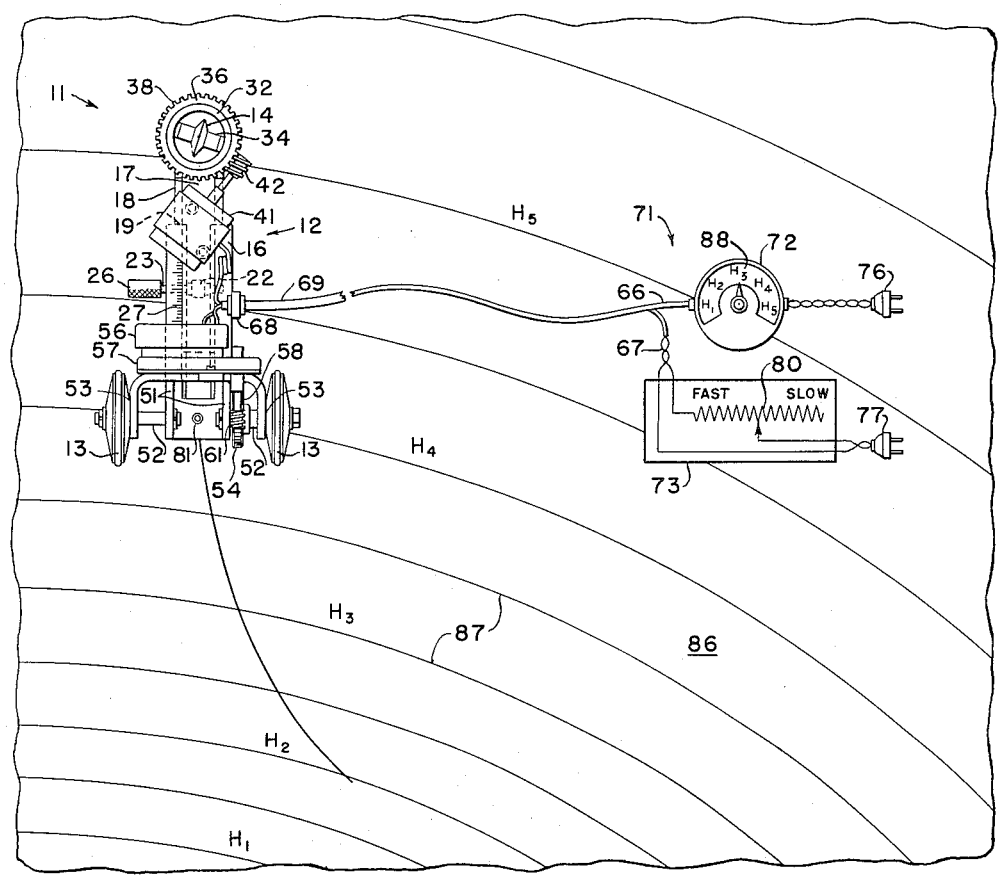
FIG.1
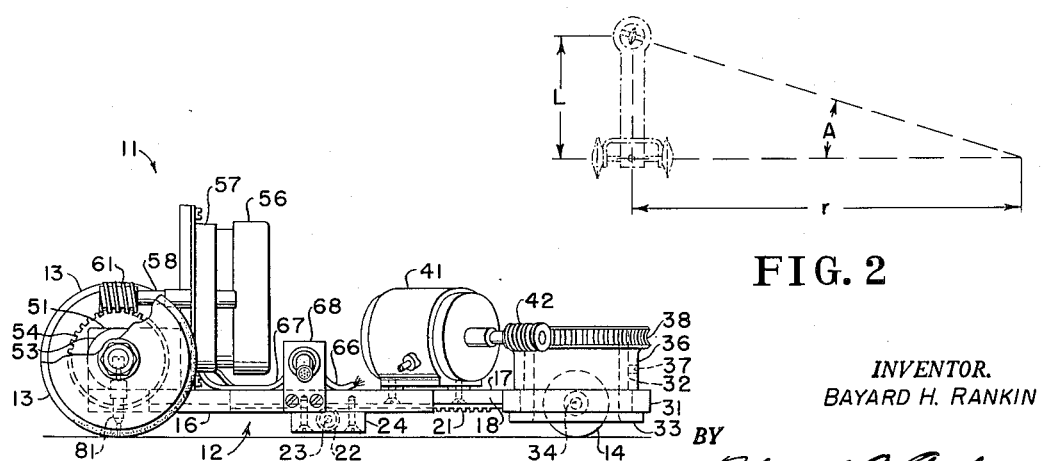
FIG.2
FIG.3
INVENTOR.
BAYARD H. RANKIN
BY
Roland A. Anderson
ATTORNEY INVENTOR.
BAYARD H. RANKIN
BY
*Roland A. Anderson*
ATTORNEY

United States Patent Office 2,751,273
Patented June 19, 1956

2,751,273

PARTICLE TRAJECTORY PLOTTER

Bayard H. Rankin, Berkeley, Calif., assignor to the United States of America as represented by the United States Atomic Energy Commission Application October 7, 1952, Serial No. 313,418

6 Claims. (Cl. 346—8)

The present invention relates to a particle trajectory plotter and more particularly to a mechanical particle for tracing the paths of atomic particles traversing non-uniform magnetic fields, the strength and variation of which are known.

The nature of the motion of charged particles traveling transversely through a magnetic field is such that the radius of curvature is a function of several quantities, as seen from the equation:

$$r = \frac{mvc}{He}$$

where $r$ is radius of curvature, $m$ is a relativistic mass of the particle, $c$ is speed of light, $v$ is velocity of the particle, $H$ is magnetic field strength, and $e$ is charge of the particle. It will be readily apparent that, where a given charged particle travels transversely through a constant magnetic field with a constant velocity, the radius of curvature is constant and need be calculated only once in order that the trajectory may be traced on a field plot. However, where the magnetic field is non-uniform, while other factors are constant, it becomes necessary to calculate the radius of curvature for each variation in field strength in order to obtain a similar plot. By the time the latter procedure has been carried out for several different velocities and then again for several different charged particles, a considerable period of time has lapsed and a great deal of effort has been expended.

To overcome the foregoing difficulties the present invention provides a device for automatically tracing the path of a charged particle upon the plot of a non-uniform magnetic field. Provision is made for altering operating conditions of the device to meet variations in the type of particles and also the velocity of such particles.

It is therefore an object of the present invention to provide a mechanical particle.

Another object of the invention is to provide a self-propelled carriage which may be remotely controlled to move along a path similar to that followed by a charged particle traveling transversely of a magnetic field.

Still another object of the invention is to provide an analogue machine for directly plotting the motion of a charged particle in a transverse magnetic field.

A further object of the invention is to provide a simple and rugged device for directly solving the equations of motion of charged particles through a transverse magnetic field.

A still further object of the invention is to provide an analogue machine, the structure of which may be altered to conform to requirements as to operation of the device as different types of particles.

Other objects and advantages of the present invention will be readily apparent from the following description and claims considered together with the accompanying drawing in which:

Figure 1 is a plan view of the invention in use;

Figure 2 is a schematic illustration of the invention of Fig. 1;

Figure 3 is an elevational view, partly in section, of the invention of Fig. 1;

Figure 4:
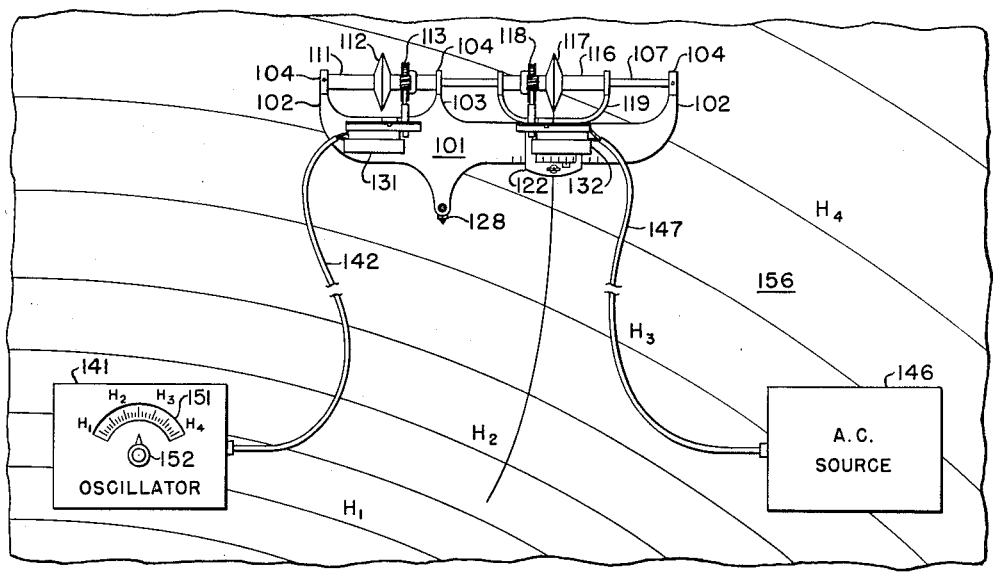
Figure 4 is a plan view of a second embodiment of the invention in use.

Referring to the drawing, and to Figs. 1 to 3 in particular, there is provided a carriage 11 comprising, in general, a chassis 12 supported by a pair of rear wheels 13, one of which is driven, and a steering wheel 14. The chassis 12 is provided with a forked portion 16 (see Fig. 1) and an extensible portion 17, the longitudinal sides 18 of the latter portion being suitably beveled to slideably engage oppositely beveled slots 19 along the inner faces of the former portion. To control the position of the extensible portion 17, a rack 21 is suitably mounted on the under face thereof and a pinion 22 engaging the rack is mounted on an axle 23 which is journalied at either end in blocks 24 mounted on the forked portions 16. A knurled knob 26 is provided at one end of the axle 23 for ease of adjustment and a vernier scale 27 may be suitably positioned and calibrated for setting the length of the chassis 12.

A ring 31 is suitably mounted on the extensible portion 17, as an extension thereof, to receive a cylindrical sleeve 32 having a flanged portion 33 at one end. Mounted on an axle 34, suitably journaled, within the sleeve 32 is the steering wheel 14. An outer sleeve 36 is provided to slip over the sleeve 32 and to be rigidly fastened thereon in a suitable manner, as by a set screw 37. Such outer sleeve 36 is also provided with a gear 38 mounted about the circumference thereof. With the foregoing elements suitably assembled there is provided a rotatable assembly for angularly varying the position of the steering wheel 14 with respect to the longitudinal dimension of the chassis 12. To drive the rotatable steering assembly a self-synchronous motor 41 is suitably mounted on the extensible portion 17 of the chassis 12, as by screws, in such a position that a worm gear 42 mounted on the shaft of the motor engages the gear 38. Thus any rotation of the armature of the motor 41 will be transmitted to change the position of the steering wheel 14.

At the rear of the forked portion 16 of the chassis 12 there is provided a pair of upright supports 51 which serve to journal one end of a pair of axles 52, respectively. A U-shaped member 53 is mounted transversely on the forked portion 16 and serves to journal each of the axles 52 at a position substantially midway of the length thereof. Mounted at the outer ends of the axles 52 are the rear wheels 13. One of the axles 52 is suitably provided with a driving gear 54. Supported on the forked portion 16 of the chassis 12 is a driving motor 56 having a gear box 57 mounted on one side thereof. A stub shaft 58 is supported rotatably at one end by the gear box 57 and carries at the other end a worm gear 61 engaging the driving gear 54. From the foregoing it will be readily apparent that upon energization of the driving motor 56 the rotation of the armature thereof will be transmitted through the gears and shaft to the driving wheel 13 to propel the carriage 11. Electrical leads 66 and 67 of the self-synchronous motor 41 and the driving motor 56 are trained across the bed of the chassis 12 to a fitting 68, suitably mounted on one side of the forked portion 16, with sufficient slack in the former leads 66 to permit freedom of movement of the extensible portion 17. From the fitting 68 the leads 66 and 67 extend in cable form 69 to a remote operating position 71. The cable 69 is split at such remote position 71 with the leads 66 being connected to a self-synchronous transmitting motor 72 and the leads 67 to a suitable speed control device 73. To provide operating voltages a separate plug 76 and 77 is connected to the input of the transmitting motor 72 and the speed control device 73, respectively. The connections between the two self-synchronous motors are conventional so that a rotation of the armature of the transmitter motor 72 results in a similar rotation of the other self-synchronous motor 41 to change the position of the steering wheel 14. The speed control device 73 may comprise a potentiometer 80 in series in one of the leads 67, as illustrated in Fig. 1.

To chart the course of the mechanical particle described in the foregoing paragraphs there is provided a suitable stylus 81 suspended from the forked portion 16 of the chassis 12 at a point midway between the rear wheels 13 and in alignment with the axles 52 thereof.

In operation of the mechanical particle described in the foregoing paragraphs, the first step is to place the device upon a plot 86 of the magnetic field through which it is desired to determine the path of charged particles. Preferably such field plot is suitably contoured with lines 87 joining points having the same value of field strength, as illustrated in Fig. 1. It will then be readily apparent that for a given particle the equation set forth above becomes $$r = \frac{K}{H}$$

where K is a constant equal to $$\frac{mcv}{e}$$

Under such circumstance it is seen that, with the dimension "L" between the steering wheel 14 and rear wheels 13 (see Fig. 2) of the invention fixed, the relation $$\tan A = \frac{L}{r}$$

exists where $r$ is the radius of curvature of the device. Since $$r = \frac{K}{H}$$

then $$\tan A = \frac{LH}{K}$$

so that the tangent of the angle A varies proportionately with respect to H. Such proportionality then permits calibration of a fixed scale 88 on the transmitter motor 72, whereby the turning radius of the mechanical plotter can be remotely controlled in accordance with the variation of the magnetic field being traversed.

Having established the foregoing relationship, it will then be readily apparent that the dimension "L" of mechanical particle is substantially proportional to $$\frac{m}{e}$$

which are factors having different values for different types of particles. As has been described in the foregoing the chassis 12 is extensible so that the dimension "L" thereof may be changed to proportionately simulate various types of particles by rotating the knob 26. For example, the mechanical particle described can traverse the path of a 70 Mev π-meson in a magnetic field of 15,000 gauss by setting the dimension "L" at 3.43 inches so that half-field values can be read on a half-sacle contour map of the field.

Figure 5:
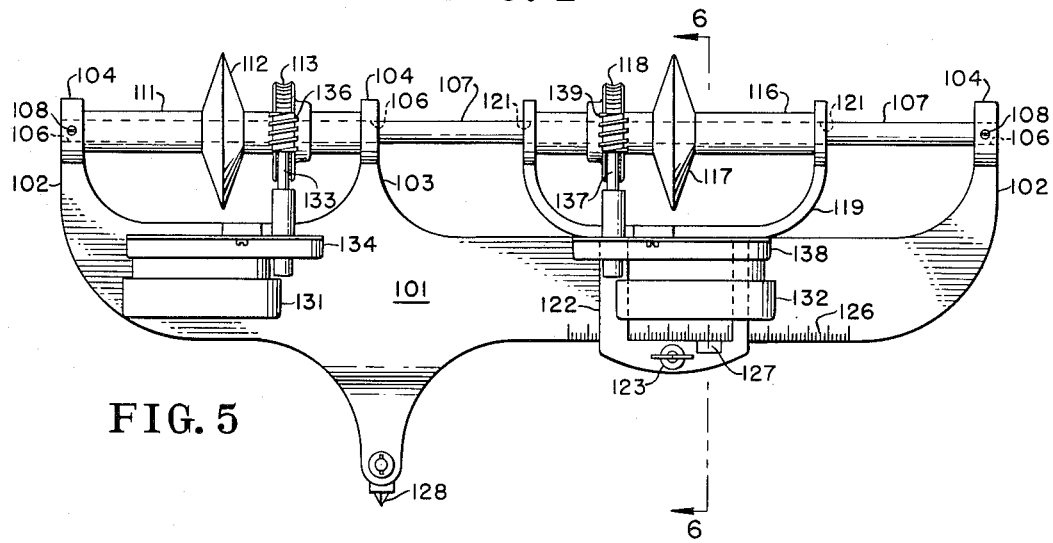
Figure 5 is an enlarged plan view of the invention of Fig. 4.
Figure 6:
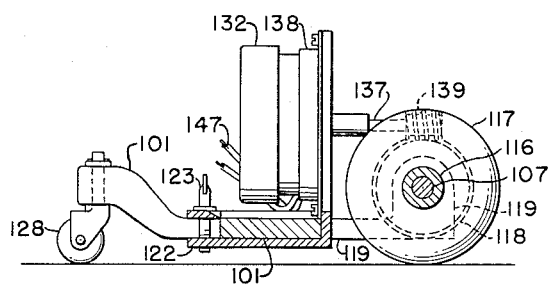
Figure 6 is an elevational view taken in section along the line 6—6 of Fig. 5.

Now refer to Figs. 4–6, inclusive, of the drawing wherein a second form of the present invention is illustrated. There is provided an elongated chassis 101 having an arm 102 extended transversely from each end thereof in the same plane as the bed of the chassis. A third arm 103 extends transversely from the chassis, in the manner of the arms 102, and intermediately of such arms. Each of the arms 102 and 103 carries a vertically extended portion 104 which is pierced by a hole 106 to receive a rod 107. To prevent the rod 107 from turning, the outer vertically extended portions 104 are each provided with a suitably mounted set screw 108.

Mounted rotatably on the rod 107, between the intermediate arm 103 and one of the outer arms 102, is a sleeve axle 111 carrying a suitably mounted wheel 112. Also mounted on the sleeve axle 111 is a driving gear 113. Preferably, the sleeve axle 111 is substantially of the same length as the distance between the arms 102 and 103 so that lateral shifting of the position of the wheel 112 is prevented.

A second sleeve axle 116, similar to the sleeve axle 111, is rotatably mounted on the rod 107, between the intermediate arm 103 and the other outer arm 102, and carries a wheel 117. Similarly, the sleeve axle 116 is provided with a driving gear 118. The length of the sleeve axle 116 is preferably less than that of the rod 107 between the intermediate arm 103 and other outer arm 102 so that the distance between the two wheels 112 and 117 can be adjusted. Such adjustability is provided by a U-shaped member 119 which has a spread substantially equal to the length of the sleeve axle 116 and legs conforming to the shape of the outer arms 102 so that openings 121 slideably engage the rod 107 on either side of the sleeve axle. A slide 122 is suitably disposed about the chassis 101 and attached to the U-shaped member 119. There is provided a suitable clamp 123 for the slide 122, such as a screw extending through the upper portion and threadably engaging the lower portion of the slide, so that a compressive pressure can be applied to firmly affix the slide on the chassis 101 and thereby the position of the wheel 117. A calibrated scale 126 can be inscribed on the chassis 101 and an indicator mark 127 on the slide 122 to facilitate the setting of the distance between the wheels 112 and 117.

As an additional support for the chassis 101, there is provided a caster 128 suitably mounted under a portion of the chassis extended oppositely from the arms 102 and 103. From the foregoing, it will be readily apparent that a mobile unit supported on three wheels has been provided.

Each of the wheels 112 and 117, for the purpose of the present invention, is provided with separate frequency-responsive driving motors 131 and 132, respectively. The motor 131 is suitably mounted upon the chassis 101 so that a shaft 133 projecting from the gear box 134 thereof engages the driving gear 113 by means of a worm gear 136 mounted on such shaft. The other motor 132 is suitably mounted on the slide 122 so that a shaft 137 projecting from the gear box 138 thereof engages the driving gear 118 by means of a worm gear 139.

With such an arrangement, an oscillator 141 of conventional design, having provision for varying the frequency of the output voltage thereof, is connected to the motor 131 by leads 142. An alternating current source 146, having a constant frequency, is connected to the motor 132 by leads 147. Preferably such oscillator 141 and source 146 are disposed remotely with respect to the position of the mechanical particle with sufficient slack in the leads 142 and 147 to permit free movement of the device.

To provide a trace of the path of the particle the circumference of the wheel 117, having a constant speed, may be inked (as shown in Fig. 4) or a stylus (not shown) may be suitably mounted on the slide 122. From the foregoing, it will be readily apparent that there has been described a device which may be remotely controlled to trace a path in a desired manner.

Consider now the geometry of the device in connection with the physics of the problem to be solved. It will be seen that, with the distance between the two driving wheels 112 and 117 set at a predetermined value by means of the slide 122, the device can be made to follow a curved path by varying the speed of one motor 131 with respect to the constant speed of the other motor 132. Such operation has an effect similar to varying the diameter of one wheel with respect to the other, thus permitting a trigonometric and geometric consideration resulting in a finding that the angular velocity of the variable speed wheel 112 is linearly related to the magnetic field strength. The reasoning is similar to that set forth in the instance of the formerly described embodiment of the invention. It may also be readily shown that an adjustment of the distance between the wheels 112 and 117 is substantially proportional to the mass-to-charge ratio of charged particles so that the present embodiment is as versatile as the former. Since the derivation of the factors stated can be ascertained by simple analysis of the device, and a similar analysis has been previously set forth, such consideration will not be detailed. The establishment of the foregoing relationship then permits a scale 151 on the oscillator 141 to be calibrated in values of magnetic field strength for use with a pointer 152 suitably linked with the frequency varying means of the oscillator.

With the device assembled in the manner described, the paths of various charged particles may be traced on a plot 156 of the magnetic field being explored in a manner similar to that previously described.

From the foregoing, it will be readily apparent that two mechanical particles have been described, which are rugged and of simple design. In the first embodiment, accuracy is affected only by the degree of care in machining the mounting of the steering wheel 14 and in calibrating the transmitter self-synchronous motor 72, and neither of these is difficult. In the latter embodiment the distance between the two driving wheels must be accurately controlled as well as the diameters of such wheels. Such matters are those of skillful machining and therefore readily attainable.

While the present invention has been described in detail with respect to two embodiments it will, of course, be apparent that numerous modifications may be made within the spirit and scope of this invention and it is therefore not desired to limit the invention to the exact details shown except insofar as they may be defined in the following claims.

What is claimed is:

1. In a device for plotting the trajectory of atomic particles on a contour map of a magnetic field, the combination comprising a freely movable carriage having a chassis, a driving wheel, a steering wheel, and a stabilizing wheel, said wheels being rotatably affixed on said chassis at triangularly disposed positions by separate mountings, one of such mountings including means movable on said chassis to alter the distance between said steering wheel and said driving wheel; a first remotely controlled motor geared to said driving wheel for propelling said carriage at a substantially constant speed; and a second remotely controlled motor geared to said steering wheel for guiding said carriage in accordance with the contours being crossed.

2. In a curve plotting device, the combination comprising a contour plot of a magnetic field, a tricycle carriage disposed on said plot, means provided on said carriage for altering the distance between one wheel and the other two, remotely controlled driving means geared to one of said other two wheels of said carriage, and remotely controlled steering means geared to said one of said wheels of said carriage, whereby the path of said carriage across said plot can be made to follow that of a given charged particle through the magnetic field.

3. In a curve plotting device, the combination comprising a carriage bed having an extensible portion, a pair of similar wheels mounted rotatably on said carriage, a third rotatable wheel mounted pivotally on the extensible portion of said carriage, remotely controlled means mounted on said carriage and geared to one of said pair of wheels for driving said carriage, a self-synchronous motor mounted on the extensible portion of said carriage and geared to the pivotal mounting of said third wheel, and a remotely-positioned self-synchronous motor connected to first mentioned self-synchronous motor, said remotely-positioned motor being calibrated in values of field strength whereby said carriage may be steered to trace the path of a charged particle on a contour plot of a magnetic field.

4. In a curve plotting device, the combination comprising a carriage bed having a first and a second portion which slideably engage each other to provide an extensible unitary element, a pair of similar wheels rotatably mounted on one of said portions, a third rotatable wheel mounted pivotally on the other of said portions, a motor mounted on said first portion and geared to one of said pair of wheels, a remotely positioned variable resistor connected between said motor and a source of electrical energy, a first self-synchronous motor mounted on said second portion and geared to the pivotal mounting of said third wheel, a second self-synchronous motor disposed at a remote position and interconnected between a source of electrical energy and said first self-synchronous motor, and a stylus suspended from said first portion for tracing the path of said carriage.

5. In a curve plotting device, the combination comprising a carriage supported by two similar leading wheels and a trailing caster, means mounted on said carriage for altering the distance between said two leading wheels as a function of particle mass, separate driving motors mounted on said carriage and geared to said leading wheels respectively, a constant speed control unit disposed at a remote position and connected to one of said motors, a variable speed control unit disposed at a remote position and connected to the other of said motors, said variable speed control unit being calibrated as a function of magnetic field strength, whereby said carriage may be guided across a contour plot of a magnetic field to trace the path of a charged particle.

6. In a curve plotting device, the combination comprising a body having three parallel arms projecting from one side thereof and an oppositely extended projection, a first wheel mounted rotatably between the intermediate arm and one of the end arms, a second wheel similar to said first wheel mounted on a slide engaging said body and positioning said second wheel between the intermediate arm and the other end arm whereby the distance between said first and second wheels may be varied, a first and second frequency-responsive motor mounted respectively on said body and said slide and geared respectively to said first and second wheels, a source of constant frequency electrical energy disposed remotely to said body and connected to said second motor, a source of variable frequency electrical energy disposed remotely to said body and connected to said first motor, said source of variable frequency being calibrated in values of magnetic field strength, and means associated with said body for marking the path thereof across a contour plot of a magnetic field.

References Cited in the file of this patent

UNITED STATES PATENTS

| 1,293,747 | Ford | Feb. 11, 1919 |
| 2,179,663 | Link | Nov. 14, 1936 |
| 2,542,490 | Ehrenfried | Feb. 20, 1951 |